UNITED STATES PATENT OFFICE.

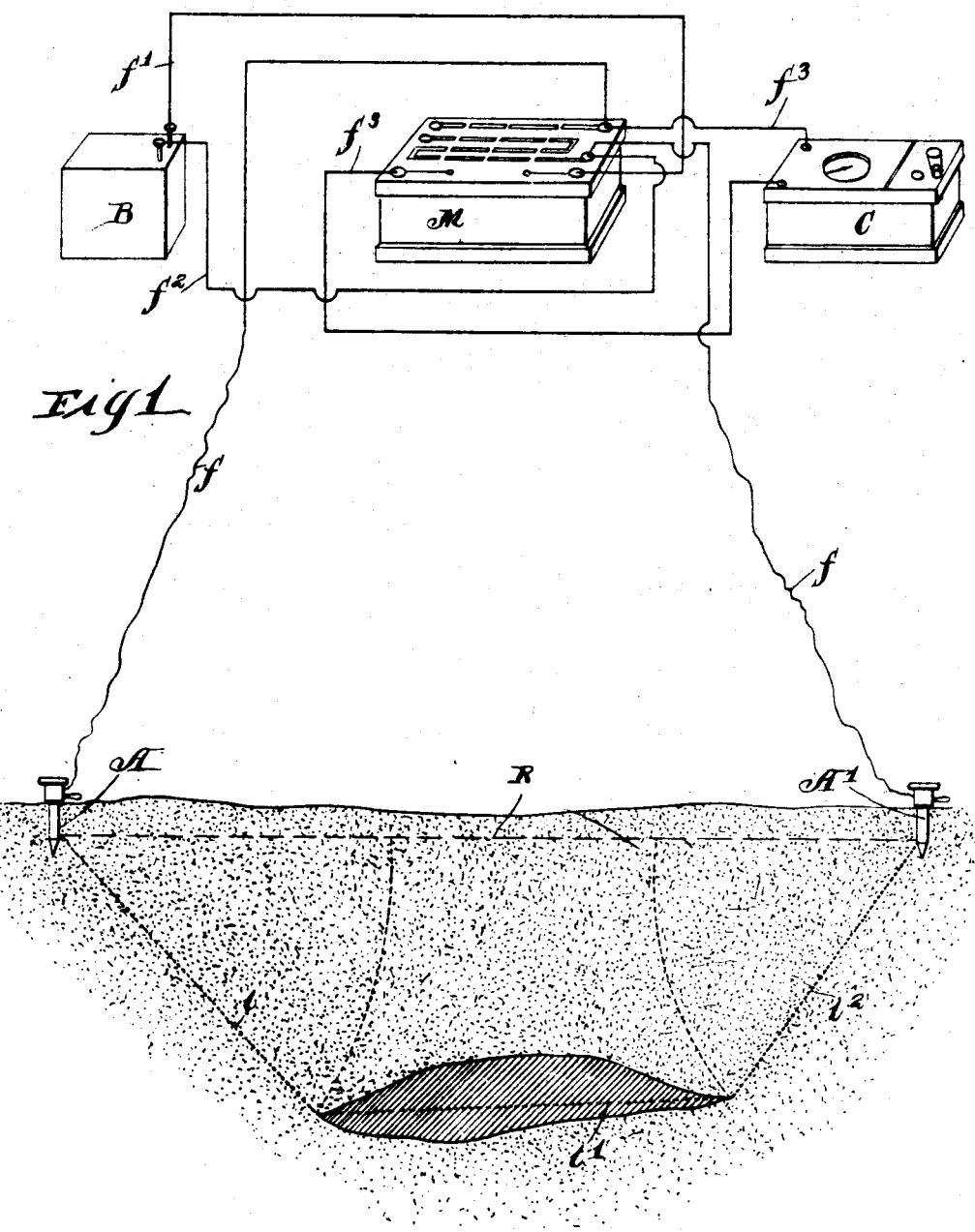

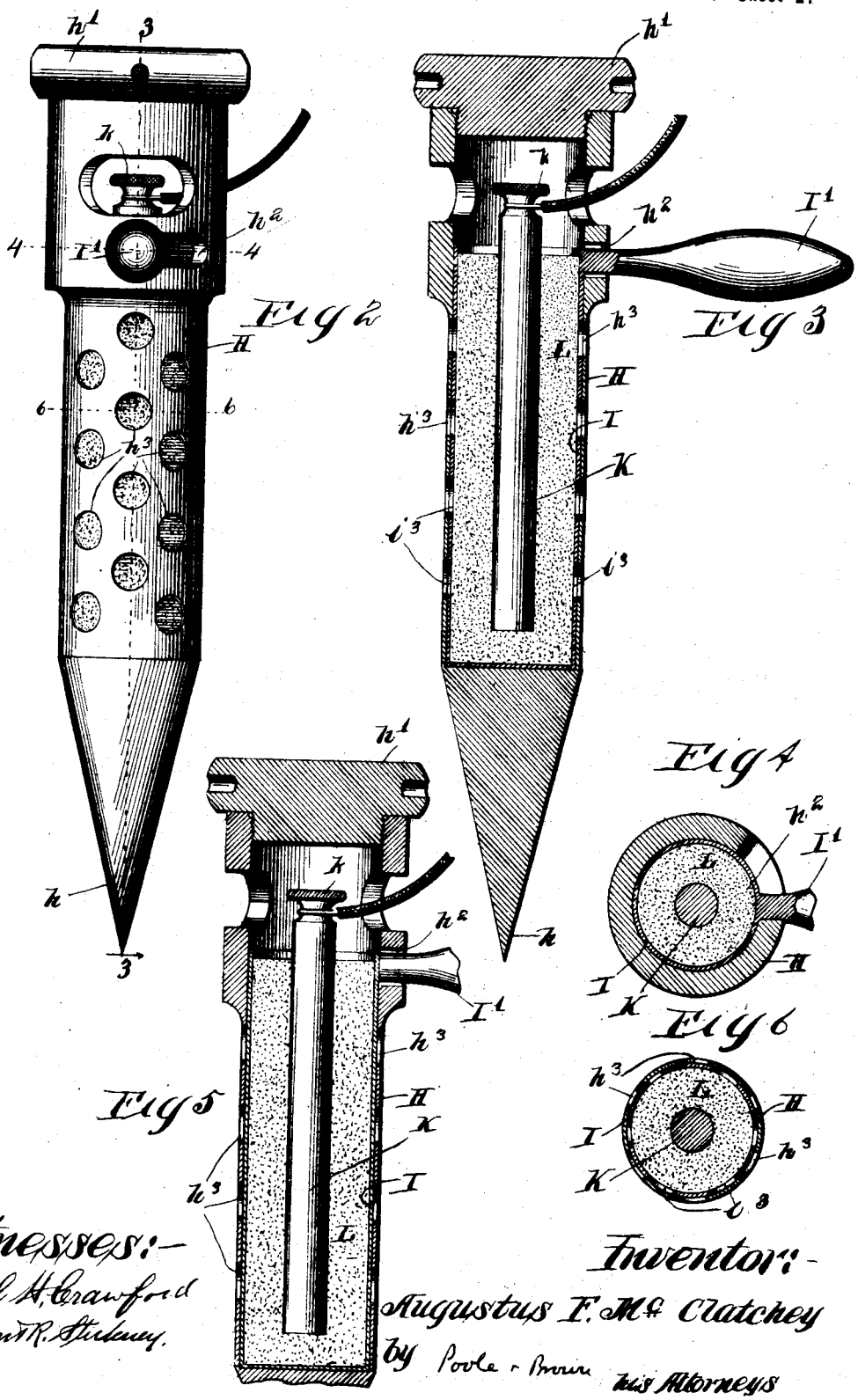

AUGUSTUS F. McCLATCHEY, OF AURORA, ILLINOIS, ASSIGNOR TO FREDERICK M. STEELE AND ERNEST DALE OWEN, OF CHICAGO, ILLINOIS.

ELECTRIC PROSPECTING APPARATUS.

SPECIFICATION forming part of Letters Patent No. 681,654, dated August 27, 1901.

Application filed April 20, 1900. Serial No. 13,585. (No model.)

*To all whom it may concern:*

Be it known that I, AUGUSTUS F. MC-CLATCHEY, of Aurora, in the county of Kane and State of Illinois, have invented certain new and useful Improvements in Electric Prospecting Apparatus; and I do hereby declare that the following is a full, clear, and exact description thereof, reference being had to the accompanying drawings, and to the letters of reference marked thereon, which form a part of this specification.

This invention relates to apparatus for locating metals, minerals, ores, and the like.

The object of the invention is to provide means which are simple, efficient, and accurate for determining the presence and location of minerals, metals, ores, and the like.

The invention consists, substantially, in the construction, combination, location, and arrangement, all as will be more fully hereinafter set forth, as shown in the accompanying drawings, and finally pointed out in the appended claims.

Referring to the accompanying drawings, and to the various views and reference-signs appearing thereon, Figure 1 is a view in diagram illustrating the arrangement of circuits and working parts of the apparatus. Fig. 2 is a view in elevation of a contact piece, pole, or terminal. Fig. 3 is a view in longitudinal section of the same on the line 3 3 of Fig. 2. Fig. 4 is a view in transverse section on the line 4 4 of Fig. 2. Fig. 5 is a broken view similar to Fig. 3, showing a displaced position of the parts. Fig. 6 is a transverse section on the line 6 6, Fig. 2.

In Patent No. 645,910, issued March 20, 1900, to Fred H. Brown, is set forth, described, and claimed a method which consists in establishing a circuit through a definite distance of the earth and measuring the resistance of the earth portion of said circuit, then establishing a circuit through the same distance at various other points in the same vicinity and measuring the resistance of the earth portion of said circuits, and finally comparing such measurements, and in a pending application of Fred H. Brown, Serial No. 2,562, filed January 24, 1900, is set forth, described, and claimed a construction of apparatus for carrying such process into practical operation.

In the practical operation of an apparatus and method as set forth and described in the patent and application referred to suitable terminals are placed in or in contact with the earth a definite and known distance apart, said terminals being introduced in an electric circuit, the earth between the terminals forming part of such circuit. The resistance of the earth portion of this circuit is then measured. The location of the terminals is then shifted to another point in the same vicinity and with the terminals spaced substantially the same distance apart as before, and the resistance of the earth between the terminals at the new location is then measured and the operation repeated as often as desired or so as to cover the desired territory being prospected, and these various measurements are then compared with each other. If the resistance so measured at one point varies from that at another point in the same vicinity to a material degree, then the presence in the earth of an ore, metal, or mineral or other conducting substance at the point where the variation occurs is indicated, and if the resistance so measured at this point is markedly less than the average resistance measured in the same vicinity then it is known that ore, mineral, metal, or the like which is present at the point where there is least resistance possesses the quality of being a better conductor of electricity than the earth. By this system of measurements and comparisons of substantially the same fixed, definite, or known distance apart of the earth terminals, as above indicated, the location of the ore, metal, or mineral is determined. The next step in the operation is to determine the depth of the ore, metal, mineral, or other substance beneath the surface of the earth. This result is accomplished in the apparatus and method referred to by varying the distance or space apart of the earth terminals. Thus if ore is located fifty feet below the surface of the earth then its presence will not be indicated if the measurements of resistance are taken through a distance of one hundred feet or less of the earth— that is, if the earth terminals of the apparatus are spaced one hundred feet or less apart—for the reason that the current, following the well-known law of seeking a path of least resistance, will pass directly from one terminal to the other and will not traverse a longer path from one terminal of the bed or body of metal, ore, mineral or the like and thence back to the other terminal. If, however, the distance between the terminals be increased to two hundred feet or more, then the body of the ore, metal, mineral or the like if of conducting material will offer a path of less resistance to the current as compared with the resistance offered by the same distance of the earth without ore, metal, or minerals. Therefore by thus varying the distance through which the measurements are taken and comparing such measurements the depth of the ore beneath the surface of the earth may be accurately determined.

It will be readily observed that inasmuch as the location of the bed of ore and of its depth beneath the surface of the earth is determined by a system of comparing measurements it is not essential that the exact ohmic resistance be absolutely ascertained. It is important, however, in the use of apparatus of the nature above indicated to provide and maintain an efficient electric contact between the terminals and the earth. It has been found in practice that when simple metallic terminals are employed and driven or inserted into the earth, and especially where the earth contains more or less moisture, a decomposition takes place at the terminals, resulting in the formation of hydrogen or other material or gas upon the surface of the metallic terminals and which, forming a coating for the surface of the terminal, impairs the efficient electrical contact of the terminal with the earth, thus introducing an artificial and greatly-increased resistance in the earth portion of the circuit which is to be measured and hence rendering the comparative measurements unreliable and inaccurate.

The present invention relates to an apparatus of the character above referred to, and is specially designed to avoid the objection of the introduction of the element of unreliability mentioned by preventing the disturbing effects of the presence of a variable resistance at the earth-terminals.

Referring to Fig. 1, A A' indicate the earth-terminals adapted to be placed in or in contact with the earth at a suitably-spaced distance apart. These earth-terminals embody specific features of construction which constitute the present invention and will be hereinafter more fully described. B is a current-generator which may be of any desired type. In the particular instance shown a battery is employed. C represents a measuring device or indicator which may be of any desired or suitable construction—such, for instance, as a galvanometer. M represents a resistance-measuring apparatus which may be in the form of a Wheatstone bridge of the usual or any suitable construction and provided with the usual connections and circuit-breaking devices. The conducting-wires $f\,f$ connect the earth terminals A A' to the bridge at the proper binding-posts, so that the resistance of the earth portion of the circuit between the terminals A A' and represented by the dotted line R becomes the unknown arm or resistance of the bridge. Conductors $f'\,f^2\,f^3$ connect the indicating device C and the generator B with the bridge in the usual or any suitable manner. With the apparatus arranged as above described a measurement or reading is effected of the indicating device and one or both of the earth-terminals are shifted to a new location in the same vicinity and another measurement or reading is noted and the operation repeated throughout the space or territory being tested. If a body of metal or mineral or the like is located at a distance below the surface of the ground less than one-half the distance between the two terminals, the line of least resistance changes from the line R to the line $i\,i'\,i^2$. Thus by repeated measurements or readings and a comparison of the same in different places in the same vicinity not only is the presence of the body of ore, mineral, or the like thereby determined, but also by varying the distance apart of the earth terminals the distance below the surface of the earth of the ore, mineral, metal, or the like is also accurately determined.

In carrying out my invention, the special object of which is to prevent inaccuracies in the readings or measurements due to the effect of a changeable resistance at the earth-terminals, I contemplate interposing between the metal of the terminal and the earth or soil a chemical substance having the property of taking up or absorbing or counteracting the effect of any nascent or free hydrogen or other gases or materials which may be developed by the current and which would otherwise adhere to the surface of the terminal and thereby impair or destroy the efficiency of the electrical contact thereof with the earth. The material which I prefer to use for this purpose is manganese dioxid, which, if desired, may be moistened with a solution of sal-ammoniac. It is obvious that other chemicals known in the art and suitable for producing the result indicated may be employed. I also propose to use the manganese dioxid in combination with carbon in pulverized form in order to secure a desirable electrical conductivity through the mass, body, or layer of manganese dioxid, which is interposed in accordance with my invention between the metal of the terminal and the earth. The suitable and proper interposition of this protecting material between the metal terminal and the ground or earth may be effected in various ways in practice. In Figs. 2 and 3 I have shown a form of practical device for this purpose which I have found to be well adapted for use and wherein the handling and insertion of the same in the earth is facilitated. Referring to the details of construction illustrated in said Figs. 2 and 3, H is a metal tube, preferably of copper or brass, having a solid pointed tip $h$ at the end thereof which is designed to be inserted in the ground and having at its other end a solid cap or top $h'$, which, if desired and preferably, may be connected by screw-threads with said tube. I indicates a metal tube which fits closely within the outer tube H. The tubes I and H are mounted for relative rotation with respect to each other. This rotation may be secured in any suitable manner—as, for instance, by providing one of said tubes, as tube I, with a handle $I'$, arranged to extend through a transverse elongated slot $h^2$ in the outer tube. Both the outer and inner tubes are provided with openings or apertures (indicated at $h^3$ $i^3$) which by the relative rotative adjustment above referred to may be brought opposite or in register with each other. The slot $h^2$ is made of such length that by giving movement to the handle $I'$ the inner tube may be revolved through an arc sufficient to either open or close the openings or apertures in the tubes. K indicates a metal rod which constitutes the terminal proper and which is located within the inner tube I and is of considerably less size than the interior diameter of the tube, so as to leave a space between the same and the inner surface of the tube. Within this space is placed a packing of the protecting substance or chemicals employed, the latter (indicated at L) being thus interposed between the terminal proper and the surface of the earth. The rod K is provided with a binding-screw $k$, by which the conductor leading to the terminal may be attached thereto. In the specific construction shown the inner tube terminates below the outer end of the outer tube and the rod K extends a short distance beyond the end of the inner tube and within the open end of the outer tube. The outer tube is provided with suitable openings, through which the wire may be inserted and the binding-screw operated. The construction above described enables the outer tube to be driven into the ground without interference with the connection of the conductor with the rod K. The packing referred to and which is interposed in the space surrounding the rod K consists, as hereinbefore stated, of an admixture of manganese dioxid and pulverized carbon, the former being moistened, if desired, with a solution of sal-ammoniac. This material is packed into the space between the rod K and the inner tube, while the inner and outer tubes are so relatively adjusted as to close the openings or apertures therethrough. The terminal so constructed is then as a whole inserted or driven into the ground. After being inserted into the ground the inner and outer tubes are again relatively rotated, so as to bring the openings or apertures therethrough into registered relation with each other and exposing the protecting-packing to contact with the ground or soil. Before removing the terminal from the ground the openings or apertures are again closed, thus avoiding the escape or loss of the protecting agent. The rod K is preferably made of zinc, though any other metal possessing suitable conductivity may be employed. To prevent oxidation of the surface of the rod K, the same may be amalgamated. In practice I prefer to employ a rod made of zinc, because the same can be more readily amalgamated. By the construction above described I prevent the production of a variable resistance at the earth-terminal by the presence of the protecting agent, and the carbon constituent of such agent affords an efficient electrical contact with the earth, and thus I eliminate any disturbing feature which would serve to introduce inaccuracies or unreliability in the measurements or readings of the apparatus. An earth-terminal such as above described may be employed in connection with either a direct or an alternating current. A direct current such as is produced by the battery illustrated has, however, the advantage of being capable of more accurate measurement by means of a variable-resistance device, such as a Wheatstone bridge, and therefore a direct current is preferred, although I do not limit myself to the use thereof nor to a battery as a generator.

Having now set forth the object and nature of my invention and a construction embodying the principles thereof and having described such construction, its purpose, function, and mode of operation, I desire it to be understood that many variations and changes in the details thereof would readily occur to persons skilled in the art and still fall within the spirit and scope of my invention. I do not desire, therefore, to be limited or restricted to the exact details shown and described; but

What I claim as new and useful and of my own invention, and desire to secure by Letters Patent, is—

1. In an apparatus for detecting and locating minerals, metals, ores or the like in the earth, an electric generator, an indicating device and a measuring device, in combination with terminals arranged to be inserted in the earth, and means for protecting said terminals from the effects of electrolytic action, as and for the purpose set forth.

2. In an apparatus for detecting and locating minerals, metals, ores or the like, earth-terminals arranged to be inserted in the earth, and a protecting agent interposed between the terminal and the earth for protecting said terminals from the effects of electrolytic action, in combination with means for measuring the resistance of the earth portion of the circuit between said terminals, as and for the purpose set forth.

3. In an apparatus for detecting and locating minerals, metals, ores or the like in the earth, earth-terminals arranged to be inserted in the earth, a protecting agent arranged to surround said terminals to protect the same from the effects of variable resistance due to electrolytic action, in combination with means for measuring the resistance of the earth portion of the circuit between said electrodes.

4. An earth-terminal for use in measuring the electrical resistance of the earth, comprising a metallic rod, an apertured casing surrounding said rod, and a protecting material interposed between the said rod and casing, as and for the purpose set forth.

5. A terminal for use in measuring the electrical resistance of the earth, comprising a metallic rod, a tubular casing surrounding the same, said casing provided with apertures therethrough, and a filling or packing interposed between said rod and casing and consisting of a protecting agent and a granular conducting material, as and for the purpose set forth.

6. A terminal for the purpose stated, comprising a metallic rod, a surrounding casing provided with apertures, a packing of protecting material between the rod and the surrounding casing, and means for opening and closing the openings in said casing.

7. A terminal for the purpose described, comprising a metal rod, a surrounding casing consisting of inner and outer apertured shells adapted for movement with respect to each other, and a protecting agent interposed between the said rod and the said casing.

8. A terminal for the purpose described, comprising a metallic rod, a casing consisting of apertured inner and outer shells, the outer shell being provided with a solid point and with a head.

9. A circuit-terminal designed to be inserted in the earth and comprising a metallic rod, in combination with a protecting material interposed between said rod and the earth, as and for the purpose set forth.

10. A circuit-terminal adapted to be inserted in the earth and comprising a metallic rod, in combination with a combined protecting agent and conducting material surrounding said rod and interposed between the same and the earth, as and for the purpose set forth.

In testimony that I claim the foregoing as my invention I affix my signature, in presence of two witnesses, this 17th day of April, A. D. 1900.

AUGUSTUS F. McCLATCHEY.

Witnesses:
C. CLARENCE POOLE,
ERNEST DALE OWEN.